United States Patent
Akselrod et al.

(10) Patent No.: US 9,665,992 B2
(45) Date of Patent: *May 30, 2017

(54) AUTOMATED SERVICE MANAGEMENT

(71) Applicant: INTERNATIONAL BUSINESS MACHINES CORPORATION, Armonk, NY (US)

(72) Inventors: Ben Z. Akselrod, Givat Shmuel (IL); Anthony Di Loreto, Markham (CA); Brett G. King, Cary, NC (US); Steve McDuff, Markham (CA); Kyle Robeson, North York (CA)

(73) Assignee: Internaitonal Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/267,240

(22) Filed: Sep. 16, 2016

(65) Prior Publication Data
US 2017/0004461 A1    Jan. 5, 2017

Related U.S. Application Data

(63) Continuation of application No. 14/870,177, filed on Sep. 30, 2015, now Pat. No. 9,472,027, which is a
(Continued)

(51) Int. Cl.
*G07C 5/00* (2006.01)
*G07C 5/08* (2006.01)
(Continued)

(52) U.S. Cl.
CPC .......... *G07C 5/006* (2013.01); *G05D 1/0088* (2013.01); *G06Q 10/20* (2013.01); *G06Q 20/102* (2013.01);
(Continued)

(58) Field of Classification Search
None
See application file for complete search history.

(56) References Cited

U.S. PATENT DOCUMENTS 6,356,822 B1    3/2002    Diaz et al.
6,427,101 B1    7/2002    Diaz et al.
(Continued)

FOREIGN PATENT DOCUMENTS

WO    03044630 A2    5/2003

OTHER PUBLICATIONS

"Samsung Smart Driving-Solutions-Automotive | Samsung". Copyright© 1995-2014 Samsung. [online][retrieved on: Jul. 2, 2014] <http://www.samsung.com/global/business/mobile/solution/automotive/samsung-smart-driving>.

(Continued)

*Primary Examiner* — Russell Frejd
(74) *Attorney, Agent, or Firm* — John W. Hayes; William H. Hartwell (57) ABSTRACT

A computer-implemented method for automated service management includes identifying a period of time to perform a service on a transporter, wherein the transporter is one of: a vehicle, an aircraft, a watercraft, or a rail based transportation. A first location within a vicinity of the transporter is identified, wherein the vicinity is based at least in part on a known location of the transporter. The transporter is instructed to relocate to the first location and responsive to the computer determining the service of the transporter is complete, the transporter is instructed to relocate to the known location.

20 Claims, 4 Drawing Sheets

Related U.S. Application Data continuation of application No. 14/549,755, filed on Nov. 21, 2014, now Pat. No. 9,466,154.

(51) Int. Cl.
*G05D 1/00* (2006.01)
*H04L 29/08* (2006.01)
*G06Q 20/10* (2012.01)
*G06Q 50/30* (2012.01)
*G06Q 10/00* (2012.01)

(52) U.S. Cl.
CPC .............. *G06Q 50/30* (2013.01); *G07C 5/00* (2013.01); *G07C 5/085* (2013.01); *H04L 67/12* (2013.01)

(56) References Cited

U.S. PATENT DOCUMENTS

| | | | |
|---|---|---|---|
| 6,430,486 | B1 | 8/2002 | Diaz et al. |
| 6,539,296 | B2 | 3/2003 | Diaz et al. |
| 7,581,434 | B1 | 9/2009 | Discenzo et al. |
| 7,630,802 | B2 | 12/2009 | Breed |
| 8,099,308 | B2 | 1/2012 | Uyeki |
| 8,135,804 | B2 | 3/2012 | Uyeki |
| 8,270,997 | B2 | 9/2012 | Sories et al. |
| 8,468,057 | B2 | 6/2013 | Ross et al. |
| 9,053,588 | B1 | 6/2015 | Briggs et al. |
| 9,466,154 | B2 | 10/2016 | Akselrod et al. |
| 9,472,027 | B2 | 10/2016 | Akselrod et al. |
| 2004/0073468 | A1 | 4/2004 | Vyas et al. |
| 2005/0273218 | A1 | 12/2005 | Breed et al. |
| 2009/0043441 | A1 | 2/2009 | Breed |
| 2009/0254240 | A1 | 10/2009 | Olsen, III et al. |
| 2009/0326991 | A1 | 12/2009 | Wei et al. |
| 2010/0057511 | A1 | 3/2010 | Mansouri et al. |
| 2011/0172873 | A1 | 7/2011 | Szwabowski et al. |
| 2012/0277949 | A1 | 11/2012 | Ghimire et al. |
| 2014/0281712 | A1* | 9/2014 | Subbu ............... G06F 11/26 714/25 |
| 2015/0057875 | A1 | 2/2015 | McGinnis et al. |
| 2015/0170287 | A1 | 6/2015 | Tirone et al. |
| 2015/0185034 | A1 | 7/2015 | Abhyanker |
| 2015/0310674 | A1 | 10/2015 | Humphrey et al. |
| 2016/0196701 | A1* | 7/2016 | Strother ............ G06Q 10/00 701/29.3 |

OTHER PUBLICATIONS

"Mercedes-Benz S 500 Intelligent Drive Autonomous Car Self Driving Car". Published on Sep. 10, 2013. <https://www.youtube.com/watch?v=LHqB47F12vl>.
Appendix P List of IBM Patents or Patent Applications Treated as Related Dated Sep. 16, 2016. Two pages.
Original U.S. Appl. No. 14/870,177, filed Sep. 30, 2015.
Original U.S. Appl. No. 14/549,755, filed Nov. 21, 2014.

* cited by examiner

AUTOMATED SERVICE MANAGEMENT

BACKGROUND

Autonomous transportation, such as autonomous trains, currently operate in various settings from airports to metropolitan areas. Autonomous trains are capable of operating automatically without any human intervention, operations including door movements, obstacle detection, and emergency situation detection. Autonomous vehicle, aircraft, and watercraft are currently being developed, with multiple working prototypes capable of moving people and cargo between locations.

SUMMARY

Embodiments in accordance with the present invention disclose a method, computer program product and computer system for automated service management. A computer-implemented method includes identifying, by one or more processors, a first location within a vicinity of a transporter to perform a service on the transporter, wherein the vicinity is based at least in part on a known location of the transporter, wherein the transporter is one of: a vehicle, an aircraft, a watercraft, or a rail based transportation; identifying, by one or more processors, one or more travel conditions between the first location and the known location of the transporter, wherein the travel conditions include at least a delay due to traffic between the first location and the known location; assigning, by one or more processors, a weight to each of the one or more identified travel conditions; responsive to determining a sum of each weight of the identified one or more travel conditions does not exceed a threshold, determining, by one or more processors, to instruct the transporter to relocate to the first location; instructing, by one or more processors, the transporter to relocate to the first location; and responsive to determining the service of the transporter is complete, instructing, by one or more processors, the transporter to relocate to the known location.

DETAILED DESCRIPTION

Current modes of non-autonomous transportation include compliance with recommended manufacturer servicing intervals for maintenance items, and servicing of particular components due to operational failure. In most instances, servicing of a non-autonomous transporter involves the user going to the service location, where the service can be performed. However, autonomous transportation can remove the involvement of the user going to the service location; that is, only the autonomous transporter travels to the service location.

Embodiments in accordance with the present invention allow for servicing of autonomous transportation. A user of an autonomous transporter has the ability to utilize an automated service program to automate the servicing of the autonomous transporter based on associated preferences provided by the user. The automated service program stores associated preferences provided by the user for the autonomous transporter, and utilizes the associated preferences to determine when and where the autonomous transporter should be serviced. Embodiments in accordance with the present invention identify a period of time within which service on the autonomous transporter should be performed based upon the associated preferences. Based on a known location of the autonomous transporter, embodiments in accordance with the present invention identify a service location within a vicinity of the known location to service the autonomous transporter. Embodiments in accordance with the present invention instruct the autonomous transporter to relocate to the service location, and, responsive to determining that service of the transporter is complete, instruct the autonomous transporter to relocate to the previous known location.

Figure 1:
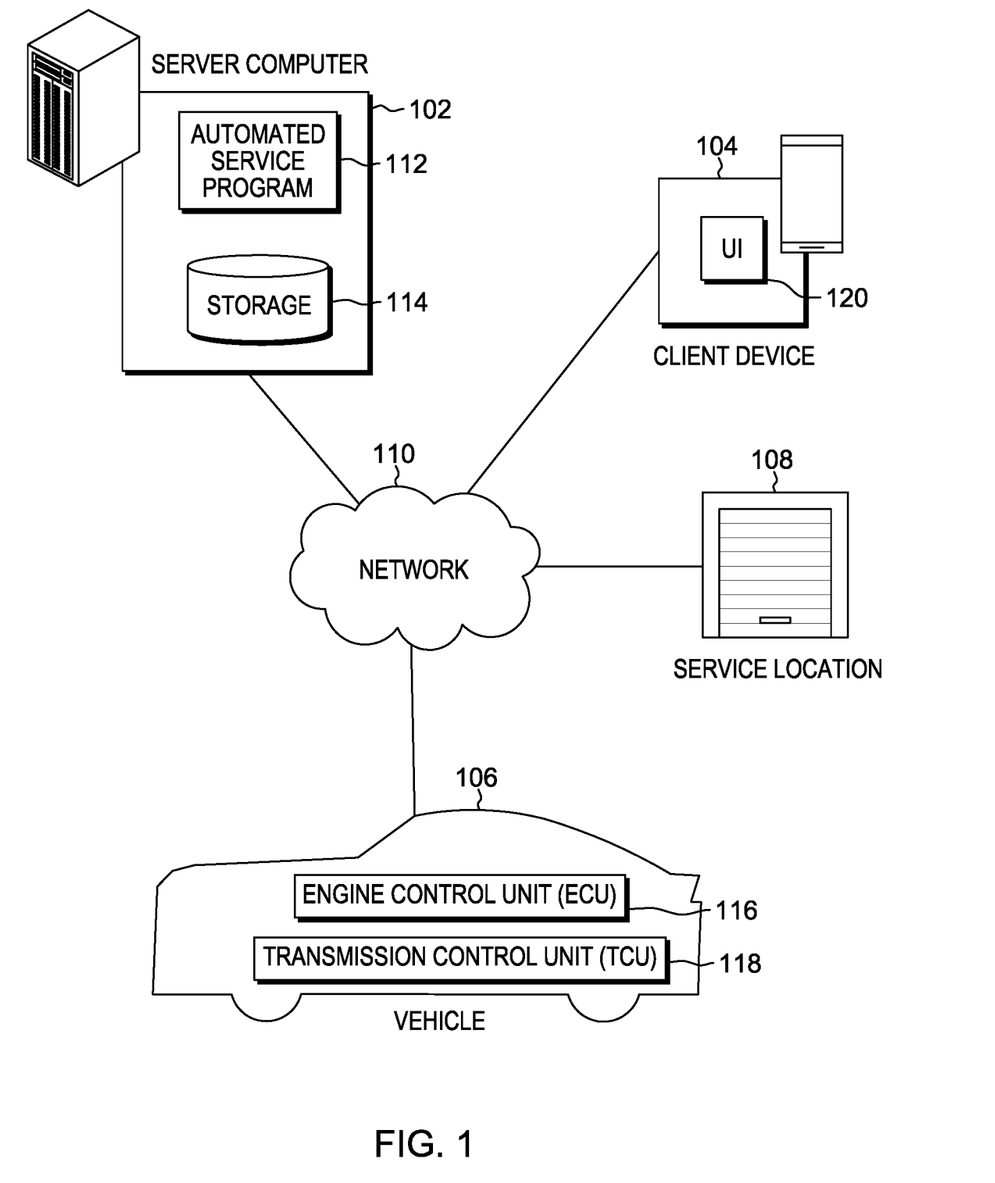
FIG. 1 is a functional block diagram illustrating a distributed data processing environment, in accordance with an embodiment of the present invention.

Example embodiments in accordance with the present invention will now be described in detail with reference to the drawing figures. FIG. 1 is a functional block diagram illustrating a distributed data processing environment, in accordance with one embodiment of the present invention. The distributed data processing environment includes server computer 102, client device 104, vehicle 106, and service location 108, interconnected over network 110.

Server computer 102 represents a computer system utilizing clustered computers and components that act as a single pool of seamless resources when accessed through server network 110, as is common in data centers and with cloud computing applications. In general, server computer 102 is representative of any programmable electronic device or combination of programmable electronic devices capable of executing machine-readable program instructions and communicating with other computer devices via a network.

Automated service program 112, stored on server computer 102, can receive operational information from vehicle 106, where the operational information is a snapshot of data from one or more components (e.g., engine control unit 116 and transmission control unit 118) on vehicle 106. Automated service program 112 can determine if service is required for vehicle 106, and can instruct vehicle 106 to drive from an identified vehicle location to a service location (e.g., service location 108) in order to have the service performed. Upon completion of the service, automated service program 112 can receive a payment request for the service from service location 108 and can send the payment to service location 108. Upon which, automated service program 112 instructs vehicle 106 to return to the originally identified vehicle location from the service location 108.

In this embodiment, automated service program 112 is stored on server computer 102 as an enterprise-based service, and manages the servicing of one or more vehicles, such as vehicle 106. In another embodiment, automated service program 112 is stored on vehicle 106 as a client-side, web-based service. Automated service program 112 management of service is not limited to a particular type of autonomous transportation (i.e., vehicles) and can include aircraft, watercraft, and rail-based transportation. Storage 114 stores information from automated program 112 including vehicle service preferences, user service preference, user payment information, manufacturer vehicle service intervals, and manufacturer service items based on the vehicle service intervals.

In general, network 110 can be any combination of connections and protocols that can support communications between server computer 102, client device 104, vehicle 106 and service location 108. Network 110 can include, for example, a local area network (LAN), a wide area network (WAN), such as the internet, a cellular network, or any combination of the preceding, and can further include wired, wireless, and/or fiber optic connections.

Client device 104 may be a laptop computer, a tablet computer, a specialized computer server, a smart phone, or any programmable electronic device capable of communication with server computer 102, vehicle 106, and service location 108 via network 110, and with various components and devices within the distributed data processing environment. For discussion purposes, the user of client device 104 receives vehicle 106 service information, where the service information can include a type of service, service locations, service duration, and service cost.

User interface (UI) 120 provides an interface between a user of client device 104 and automated service program 112. User interface 120 may be a graphical user interface (GUI) or a web user interface (WUI) and can display text, documents, web browser windows, user options, application interfaces, and instructions for operation, and includes the information (such as graphics, text, and sound) a program presents to a user, and the control sequences the user employs to control the program. User interface 120 may also be mobile application software that provides an interface between a user of client device 104 and automated service program 112. Mobile application software, or an "app", is a computer program designed to run on smart phones, tablet computers and other mobile devices. Automated service program 112 can display vehicle 106 service information in user interface 120 of client device 104, and any other notification which automated service program 112 sends to the user of vehicle 106.

Figure 2:
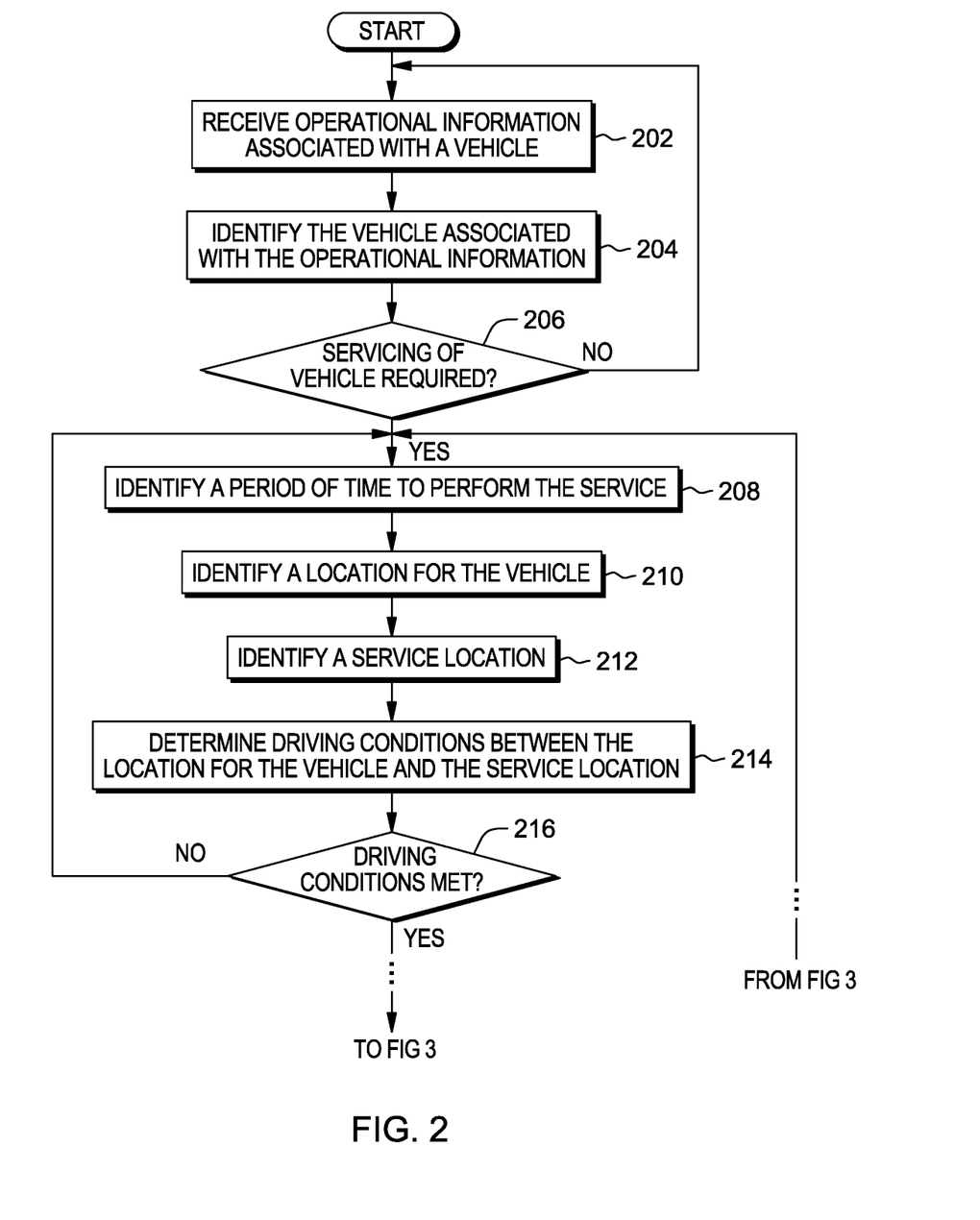
FIG. 2 is a flowchart depicting operational steps of an automated service program for managing autonomous transportation service, in accordance with an embodiment of the present invention.

FIG. 2 is a flowchart depicting operational steps of an automated service program for managing autonomous transportation service, in accordance with an embodiment of the present invention.

Automated service program 112 receives operational information associated with a vehicle (step 202). In this embodiment, automated service program 112 receives operational information from multiple sensors or control units on vehicle 106. Examples of control units can include engine control unit 116 and transmission control unit 118 on vehicle 106. Examples of sensors can include any type of sensor that monitors one or more aspects of an autonomous vehicle. In one embodiment, automated service program 112 can continuously receive operational information associated with vehicle 106. In another embodiment, automated service program 112 can receive operational information associated with vehicle 106 at particular pre-determined intervals. Intervals can include mileage values, flight hours, operational hours, or other intervals that aid in characterizing the operational history of a mode of transportation. For example, automated service program 112 can receive operational information associated with vehicle 106 every 100 miles traveled. In another example, automated service program 112 receives operational information when vehicle 106 determines a failure has occurred and is producing a fault code associated with the failure.

Automated service program 112 identifies the vehicle associated with the operational information (step 204). In this embodiment, the operational information, which automated service program 112 receives in step 202, includes an associated vehicle identification number (VIN) for vehicle 106. Automated service program 112 can identify the type (i.e., make, model, and year) of vehicle and the service history for vehicle 106 based on the associated vehicle identification number. In another embodiment, automated service program 112 can receive operational information for an aircraft, where the operational information includes an associated tail number for the aircraft. Automated service program 112 can identify the type (i.e., make, model, year, and configuration) of aircraft and the service history for that particular aircraft based on the associated tail number for the aircraft.

Automated service program 112 determines if servicing of the vehicle is required (decision step 206). In the event automated service program 112 determines servicing of the vehicle is not required ("no" branch, step 206), automated service program 112 reverts back to step 202 and continues to receive operational information associated with the vehicle. In the event automated service program 112 determines servicing of the vehicle is required ("yes" branch, step 206), automated service program identifies a period of time within which to perform the service (step 208).

In this embodiment, automated service program 112 includes vehicle manufacturer information, where vehicle manufacturer information includes service intervals based on predetermined intervals (e.g., vehicle mileage or time between service) and one or more items included in the service associated with each interval. In one example, the service interval for vehicle 106 is 10,000 miles or 365 days, whichever occurs first, with a tolerance of 500 miles and 5 days, respectively. In the event that automated service program 112 determines that vehicle 106 has reached the 10,000 mile point, automated service program 112 determines servicing of vehicle 106 is required. In another embodiment, automated service program 112 includes aircraft manufacturer information, where the aircraft manufacturer information includes a recommended service schedule based on the interval since the last service (e.g., flight hours or time since last service) and one or more items included in a service associated with each service interval. In another example, service interval for an aircraft is 5,000 flight hours or 365 days, whichever occurs first, with a tolerance of 250 flight hours and 5 days respectively. Automated service program 112 determines that the aircraft has not reached the 5,000 flight hours or the 365 day interval, and determines servicing of the aircraft is not required.

In yet another embodiment, automated service program 112 determines, based on the received operational information associated with a vehicle, that the vehicle needs to be charged or refueled. The received operational information can include energy reserve information, where energy reserve information is an amount of electric charge or an amount of fuel vehicle 106 has in reserve. Automated service program 112 can determine if the amount of electric charge or the amount of fuel that vehicle 106 has in reserve is below a pre-determined threshold. If automated service program 112 determines the amount of electric charge or the amount of fuel vehicle 106 has in reserve is below a pre-determined threshold, automated service program 112 determines servicing of vehicle 106 is required. In this embodiment, the servicing of the vehicle includes restoring the amount of electric charge or the amount of fuel above the threshold level. In another embodiment, the servicing of the vehicle includes restoring the amount of electric charge or the amount of fuel to a fully charged or fully fueled level, respectively.

Automated service program 112 identifies a period of time to perform the service (step 208). The period of time to perform the service is an allotted time determined by the user of vehicle 106 when automated service program 112 can instruct vehicle 106 to perform automated servicing. In this embodiment, automated service program 112 includes user preferences for vehicle 106, where user preferences include one or more periods during the week when the service for the vehicle can be performed. For example, a period of time can include 6 hours between the hours of 12 a.m. and 6 a.m. when vehicle 106 is not utilized or 8 hours between the hours of 9 a.m. and 5 p.m. when the user of vehicle 106 is at work. Automated service program 112 can receive user preferences for each vehicle that automated service program 112 manages, and stores the user preferences until they are altered by the user or if the vehicle is no longer associated with that particular user.

Automated service program 112 identifies a current location (such as a home location) for the vehicle (step 210). In this embodiment, automated service program 112 utilizes global positioning system (GPS) information for the vehicle to identify the location of the vehicle. Automated service program 112 can receive the location of the vehicle when receiving operational information in step 202. In another embodiment, automated service program 112 can query the vehicle for GPS information associated with the vehicle, receive the GPS information associated with the vehicle, and determine the location of the vehicle based on the GPS information.

In an alternative embodiment, automated service program 112 can query multiple locations to determine if vehicle 106 is present at one of the multiple locations. In one example, a work location and a home location each include a sensor capable of determining if vehicle 106 is present. The work location can include a designated spot assigned specifically to vehicle 106 and the home location can include a driveway, where vehicle 106 typically parks. A sensor in the designated spot or driveway can determine if vehicle 106 is currently present at that location. Subsequent to receiving sensor information from the work location and home location, automated service program determines if the current location for vehicle 106 includes either or neither, the home location or the work location.

Automated service program 112 determines a service location (step 212). In this embodiment, automated service program 112 identifies service locations in the vicinity of the previously identified vehicle location in step 210, where the vicinity is a distance based on a predetermined radius measured from the identified location of vehicle 106. In the event that automated service program 108 identifies two or more service locations in the vicinity of vehicle 106, automated service program 112 can query each of the one or more locations to determine if the service can be performed during the allotted period of time identified in step 208. When the automated service program 112 determines there are two or more service locations in the vicinity of vehicle 106 that can perform the service during the allotted period of time, automated service program 112 may select the service location closest to the previously identified location of vehicle 106.

Automated service program 112 determines driving conditions between the identified location for the vehicle and the service location (step 214). In this embodiment, driving conditions include traffic, weather, and any detours between the originating location of the vehicle and the service location. Automated service program 112 can query local weather, traffic, and road monitoring services to compile respective information to determine the current driving conditions. Automated service program 112 can assign weights to each driving condition to calculate a driving conditions value. For example, optimal weather conditions (i.e., clear and sunny) can have a value of 10, whereas deplorable weather conditions (i.e., heavy snow and windy) can have a value of 1. In another example, traffic with a low average speed (i.e., less than 5 mph) can have a value of 1, whereas traffic with a high average speed (i.e., more than 65 mph) can have a value of 10. Automated service program 112 can sum the various driving condition values to determine an overall driving condition value.

Automated service program 112 determines if suitable driving conditions are met (decisions step 216). In the event that automated service program 112 determines the driving conditions are not met ("no" branch, step 216), automated service program 112 reverts back to step 208 to determine another period of time in which to perform the service. If, on the other hand, automated service program 112 determines the driving conditions are met, automated service program 112 determines if manual approval is required. In this embodiment, automated service program 112 utilizes the overall driving condition value determined in step 214 to determine if the overall driving condition value meets or exceeds a pre-determined driving condition threshold value. For example, if the driving condition threshold value is 15 and automated service program 112 determines that the overall driving condition value is 12, automated service program 112 determines the driving conditions are not met.

Figure 3:
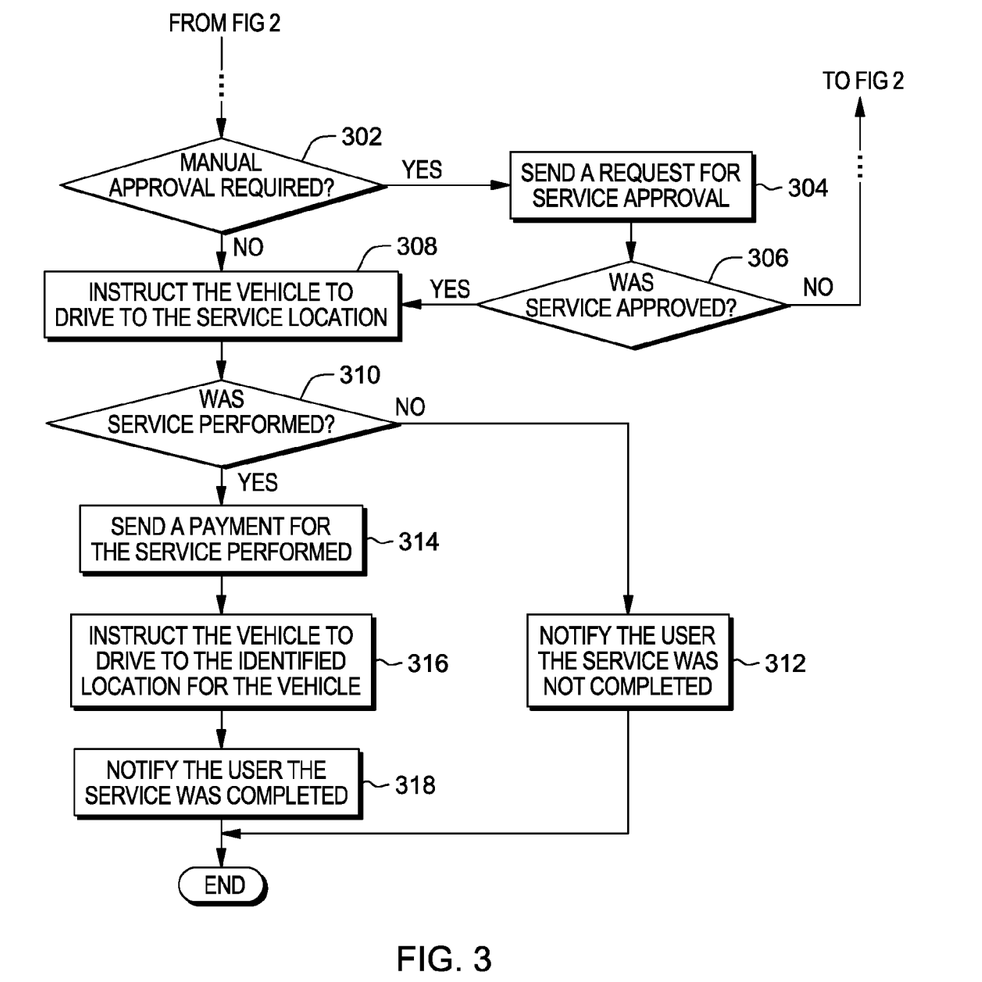
FIG. 3 is a flowchart depicting continued operational steps of an automated service program for managing autonomous transportation service, in accordance with an embodiment of the present invention.

FIG. 3 is a flowchart depicting continued operational steps of an automated service program for managing autonomous transportation service, in accordance with an embodiment of the present invention.

Automated service program 112 determines if manual approval is required (decision step 302). In the event that automated service program 112 determines manual approval is required ("yes" branch, step 302), automated service program 112 sends a request for service approval (step 304). If automated service program 112 determines manual approval is not required ("no" branch, step 302), automated service program 112 instructs the vehicle to drive to the service location (step 308). In this embodiment, manual approval represents whether or not automated service program 112 has to obtain approval each time a service is to be performed on the vehicle. Automated service program 112 can include programmable automatic or manual service approval preferences for each user of a particular vehicle.

Automated service program 112 sends a request for service approval (step 304). In this embodiment, automated service program 112 previously determined, in decision step 302, that manual approval was required, and sends the request for service approval to client device 104 associated with the user of vehicle 106. The request can prompt a notification with the request for the service approval in user interface 120 via an internet-based mobile application on client device 104. The user can view the notification on client device 104 and respond to the request sent by automated service program 112.

Automated service program 112 determines if service was approved (decision step 306). In the event that automated service program 112 determines the service was not approved ("no" branch, step 306), automated service program 112 reverts back to step 208 to identify another period of time to perform the service. If automated service program 112 determines the service was approved ("yes" branch, step 306), automated service program 112 instructs the vehicle to drive to the service location (step 308).

Automated service program 112 instructs the vehicle to drive to the service location (step 308). In this embodiment, the user of client device 104 approves the service via the web-based mobile application, and automated service program 112 receives the approval for the service of the vehicle. Automated service program 112 instructs the vehicle to drive to the service location previously determined in step 212. In this embodiment, the vehicle is an autonomous vehicle capable of driving to the service location without human intervention. In another embodiment, the vehicle is an unmanned vehicle (i.e., drone) operated remotely by a user, where the user remotely operating the unmanned vehicle receives the instructions to drive the vehicle to the service location. In yet another embodiment, automated service program 112 instructs the vehicle to drive to the service location by sending navigational information and the overall driving condition value to the vehicle, so that the user of the vehicle can navigate the vehicle to the service location. As previously mentioned, automated service program 112 is not limited to vehicles and can include aircraft and watercraft. Therefore, automated service program 112 can instruct the aircraft or watercraft to proceed to the service location.

Automated service program 112 determines if the service was performed (step 310). In this embodiment, automated service program 112 can determine if the service was performed in the allotted period of time for the service previously determined in step 208. Automated service program 112 can query the vehicle for the location at the end of the allotted time period to determine if the vehicle is still located at the service location. In the event that automated service program 112 determines the service was not performed ("no" branch, step 310), automated service program 112 notifies the user the service was not performed (step 312). In the alternative, if automated service program 112 determines the service was performed ("yes" branch, step 310), automated service program 112 sends a payment for the service performed (step 314).

Automated service program 112 notifies the user the service was not performed (step 312). In this embodiment, automated service program 112 determines the allotted period of time has passed, and determines the vehicle is at the service location. Automated service program 112 can send a notice to client device 104 associated with the user of vehicle 106 that the service was not performed in the allotted time, along with the service location for vehicle 106. The notification is displayed in user interface 120 via an internet based mobile application on client device 104, where the user can view the notification and determine the next course of action.

Automated service program 112 sends a payment for the service performed (step 314). In this embodiment, automated service program 112 stores payment information for vehicle 106, where payment information includes credit card information of the user of vehicle 106. Once the service is performed, automated service program 112 can utilizes the store credit card information to send the payment to the service location for the service performed. In another embodiment, automated service program 112 can receive a request for payment from the service location, and automated service program 112 can forward the request to client device 104 associated with the user of vehicle 106. The user can manually input credit card information or internet-based payment system credentials via the internet-based mobile application on client device 104, and automated service program 112 can send the payment to the service location.

Automated service program 112 instructs the vehicle to drive to the identified location for the vehicle (step 316). In this embodiment, automated service program 112 instructs the vehicle to drive to the previously identified vehicle location in step 210. As previously mentioned, vehicle 106 is an autonomous vehicle capable of driving to service location 108 without human intervention. Therefore, vehicle 106 is capable of driving back to the previously identified vehicle location. In another embodiment, the vehicle is an unmanned vehicle (i.e., drone) operated remotely by a user, where the user remotely operating the unmanned vehicle receives the instructions to drive the vehicle to the previously identified vehicle location. In yet another embodiment, automated service program 112 instructs the vehicle to drive to the previous identified vehicle location by sending navigational information to the vehicle, so that the user of the vehicle can navigate the vehicle to the previously identified vehicle location.

Automated service program 112 notifies the user the service was completed (step 318). In this embodiment, automated service program 112 sends a notice to client device 104 associated with the user of vehicle 106 that the service was performed in the allotted time period, along with a receipt for the payment and the list of one or more items performed for the service of vehicle 106. The notification can also include the location where vehicle 106 is located in the event vehicle 106 returned to a location different than the previously identified vehicle location (i.e., different parking spot). The notification is displayed in user interface 120 via an internet based mobile application on client device 104, where the user can view the notification.

Figure 4:
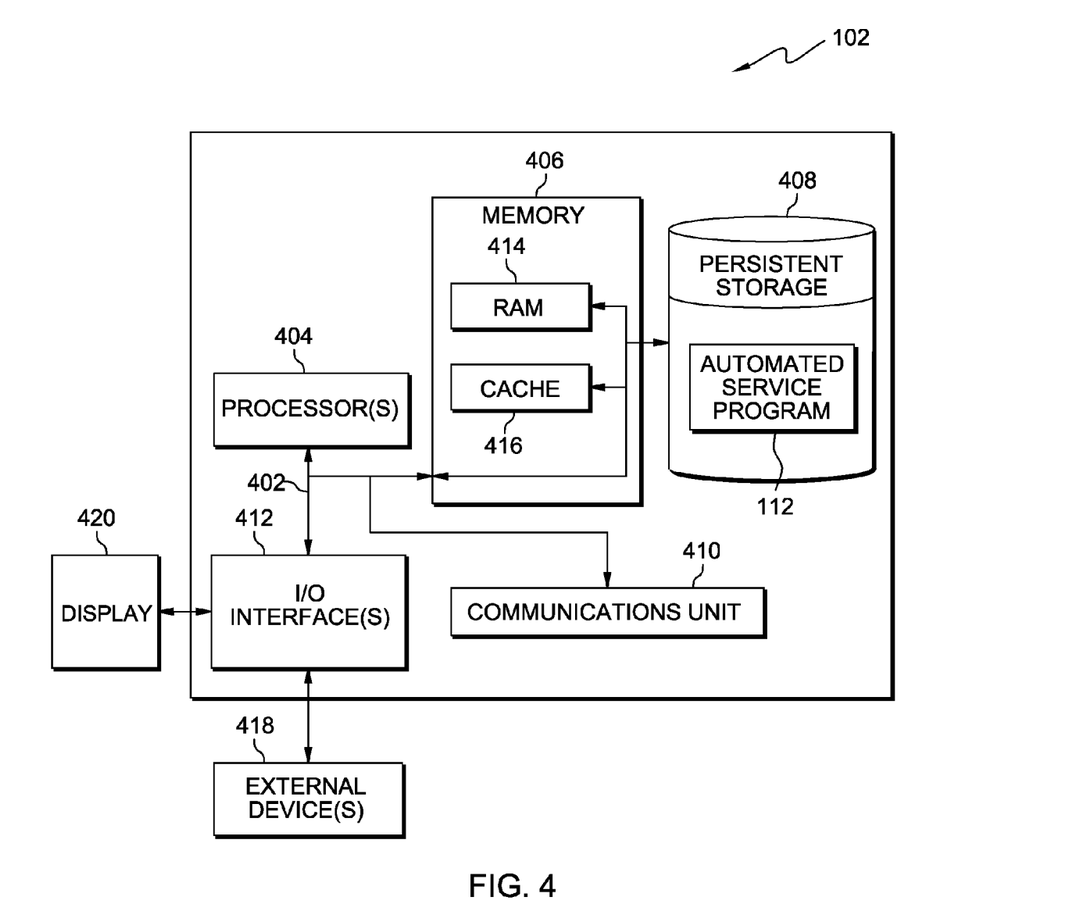
FIG. 4 is a block diagram of components of a computer system, such as the computer server of FIG. 1, in accordance with an embodiment of the present invention.

FIG. 4 depicts a block diagram of components of a computer, such as server computer 102, hosting automated service program 112 in accordance with an illustrative embodiment of the present invention. It should be appreciated that FIG. 4 provides only an illustration of one implementation, and does not imply any limitations with regard to the environments in which different embodiments may be implemented. Many modifications to the depicted environment may be made.

Server computer 102 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are examples of computer readable tangible storage devices. A storage device is any piece of hardware that is capable of storing information, such as, data, program code in functional form, and/or other suitable information on a temporary basis and/or permanent basis. In this embodiment, memory 406 includes random access memory (RAM) 414 and cache memory 416. In general, memory 406 can include any suitable volatile or non-volatile computer readable storage device.

Automated service program 112 is stored in persistent storage 408 for execution by one or more of computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage medium that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including systems and devices within or controlled by server computer 102. In these examples, communications unit 410 includes one or more wireless network interface cards. Communications unit 410 may provide communications through the use of either or both physical and wireless communications links. Computer programs and processes, such as automated service program 112, may be downloaded to persistent storage 408 through communications unit 410, or uploaded to another system through communications unit 410.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 may also connect to a display 420. Display 420 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for automated service management, the method comprising:
   identifying, by one or more processors, a first location within a vicinity of a transporter to perform a service on the transporter, wherein the vicinity is based at least in part on a known location of the transporter, and wherein the transporter is one of: a vehicle, an aircraft, a watercraft, or a rail based transportation;
   identifying, by one or more processors, one or more travel conditions between the first location and the known location of the transporter, wherein the travel conditions include at least a delay due to traffic between the first location and the known location;
   assigning, by one or more processors, a weight to each of the one or more identified travel conditions;
   responsive to determining a sum of each weight of the identified one or more travel conditions does not exceed a threshold, determining, by one or more processors, to instruct the transporter to relocate to the first location;
   instructing, by one or more processors, the transporter to relocate to the first location; and
   responsive to determining the service of the transporter is complete, instructing, by one or more processors, the transporter to relocate to the known location.

2. The method of claim 1, further comprising:
   receiving, by one or more processors, operational information associated with the transporter;
   identifying, by one or more processors, the transporter based at least in part on the received operational information; and
   determining, by one or more processors, servicing of the transporter is required based at least in part on the received operational information.

3. The method of claim 1, further comprising:
   determining, by one or more processors, if manual approval is required to instruct the transporter to relocate to the first location; and
   responsive to determining manual approval is required, sending, by one or more processors, a request for approval of the service on the transporter to a user associated with the transporter.

4. The method of claim 3, further comprising:
   sending, by one or more processors, a notification to the user associated with transporter that service was completed on the transporter; and
   sending, by one or more processors, a payment for the service completed on the transporter.

5. The method of claim 1, wherein the transporter is one of: an autonomous transporter or a drone transporter.

6. The method of claim 1, wherein identifying a first location within a vicinity of the transporter comprises:
   identifying, by one or more processors, a period of time to perform the service on the transporter;
   determining, by one or more processors, there are two or more locations within the vicinity of the transporter; and
   determining, by one or more processors, the first location out of the two or more locations can perform the service in the identified period of time.

7. The method of claim 1, wherein the travel conditions further include weather conditions between the first location and the known location and a number of detours between the first location and the known location.

8. A computer program product for automated service management, the computer program product comprising:
   one or more computer readable tangible storage media and program instructions stored on at least one of the one or more storage media, the program instructions comprising:
   program instructions to identify a first location within a vicinity of a transporter to perform a service on the transporter, wherein the vicinity is based at least in part on a known location of the transporter, and wherein the transporter is one of: a vehicle, an aircraft, a watercraft, or a rail based transportation;
   program instructions to identify one or more travel conditions between the first location and the known location of the transporter, wherein the travel conditions include at least a delay due to traffic between the first location and the known location;
   program instructions to assign a weight to each of the one or more identified travel conditions;
   program instructions to, responsive to determining a sum of each weight of the identified one or more travel conditions does not exceed a threshold, determine to instruct the transporter to relocate to the first location;
   program instructions to instruct the transporter to relocate to the first location; and
   responsive to determining the service of the transporter is complete, program instructions to instruct the transporter to relocate to the known location.

9. The computer program product of claim 8, further comprising program instructions, stored on the one or more computer readable storage media, which when executed by a processor, cause the processor to:
- receive operational information associated with the transporter;
- identify the transporter based at least in part on the received operational information; and
- determine servicing of the transporter is required based at least in part on the received operational information.

10. The computer program product of claim 8, further comprising program instructions, stored on the one or more computer readable storage media, which when executed by a processor, cause the processor to:
- determine if manual approval is required to instruct the transporter to relocate to the first location; and
- responsive to determining manual approval is required, send a request for approval of the service on the transporter to a user associated with the transporter.

11. The computer program product of claim 10, further comprising program instructions, stored on the one or more computer readable storage media, which when executed by a processor, cause the processor to:
- send a notification to the user associated with transporter that the service was completed on the transporter; and
- send a payment for the service completed on the transporter.

12. The computer program product of claim 8, wherein the transporter is one of: an autonomous transporter or a drone transporter.

13. The computer program product of claim 8, wherein identifying a first location within a vicinity of the transporter comprises, program instructions, stored on the one or more computer readable storage media, which when executed by a processor, cause the processor to:
- identify a period of time to perform the service on the transporter;
- determine there are two or more locations within the vicinity of the transporter; and
- determine the first location out of the two or more locations can perform the service in the identified period of time.

14. The computer program product of claim 8, wherein the travel conditions further include weather conditions between the first location and the known location and a number of detours between the first location and the known location.

15. A computer system for automated service management, the computer system comprising:
- one or more computer processors;
- one or more computer readable storage media; and
- program instructions stored on the computer readable storage media for execution by at least one of the one or more computer processors, the program instructions comprising:
  - program instructions to identify a first location within a vicinity of a transporter to perform a service on the transporter, wherein the vicinity is based at least in part on a known location of the transporter, and wherein the transporter is one of: a vehicle, an aircraft, a watercraft, or a rail based transportation;
  - program instructions to identify one or more travel conditions between the first location and the known location of the transporter, wherein the travel conditions include at least a delay due to traffic between the first location and the known location;
  - program instructions to assign a weight to each of the one or more identified travel conditions;
  - program instructions to, responsive to determining a sum of each weight of the identified one or more travel conditions does not exceed a threshold, determine to instruct the transporter to relocate to the first location;
  - program instructions to instruct the transporter to relocate to the first location; and
  - responsive to determining the service of the transporter is complete, program instructions to instruct the transporter to relocate to the known location.

16. The computer system of claim 15, further comprising program instructions, stored on the one or more computer readable storage media, which when executed by a processor, cause the processor to:
- receive operational information associated with the transporter;
- identify the transporter based at least in part on the received operational information; and
- determine servicing of the transporter is required based at least in part on the received operational information.

17. The computer system of claim 15, further comprising program instructions, stored on the one or more computer readable storage media, which when executed by a processor, cause the processor to:
- determine if manual approval is required to instruct the transporter to relocate to the first location; and
- responsive to determining manual approval is required, send a request for approval of the service on the transporter to a user associated with the transporter.

18. The computer system of claim 17, further comprising program instructions, stored on the one or more computer readable storage media, which when executed by a processor, cause the processor to:
- send a notification to the user associated with transporter that the service was completed on the transporter; and
- send a payment for the service completed on the transporter.

19. The computer system of claim 15, wherein the transporter is one of: an autonomous transporter or a drone transporter.

20. The computer system of claim 15, wherein the travel conditions further include weather conditions between the first location and the known location and a number of detours between the first location and the known location.

* * * * *